(12) United States Patent
Radhakrishnan et al.

(10) Patent No.: US 9,872,158 B2
(45) Date of Patent: Jan. 16, 2018

(54) VOICE PROTOCOL CONNECTOR APPARATUS

(71) Applicants: Ramesh Radhakrishnan, Chennai (IN); Balaji Swaminathan, Chennai (IN)

(72) Inventors: Ramesh Radhakrishnan, Chennai (IN); Balaji Swaminathan, Chennai (IN)

(73) Assignee: TeleKonnectors Limited IN (US)

( * ) Notice: Subject to any disclaimer, the term of this patent is extended or adjusted under 35 U.S.C. 154(b) by 843 days.

(21) Appl. No.: 13/953,234

(22) Filed: Jul. 29, 2013

(65) Prior Publication Data
US 2015/0029897 A1 Jan. 29, 2015

(51) Int. Cl.
| | |
|---|---|
| *G06F 13/42* | (2006.01) |
| *H04W 4/16* | (2009.01) |
| *H04M 9/08* | (2006.01) |
| *H04M 1/253* | (2006.01) |
| *H04M 3/56* | (2006.01) |

(52) U.S. Cl.
CPC .......... *H04W 4/16* (2013.01); *H04M 1/2535* (2013.01); *H04M 9/08* (2013.01); *H04M 3/568* (2013.01)

(58) Field of Classification Search
USPC ................................................ 710/5–8, 105
See application file for complete search history.

(56) References Cited

U.S. PATENT DOCUMENTS

| | | | | |
|---|---|---|---|---|
| 2005/0015516 A1* | 1/2005 | Ju | ........................ | H04M 1/2535 709/250 |
| 2009/0010246 A1* | 1/2009 | Grattan | ............... | H04M 1/2535 370/352 |
| 2009/0028307 A1* | 1/2009 | Kister | ............... | H04M 3/42042 379/93.03 |
| 2009/0323560 A1* | 12/2009 | Kukoleca | ............ | H04L 12/1827 370/261 |
| 2013/0156177 A1* | 6/2013 | Theivendran | ......... | H04M 3/428 379/215.01 |

* cited by examiner

*Primary Examiner* — Henry Tsai
*Assistant Examiner* — Dean Phan
(74) *Attorney, Agent, or Firm* — Donald R. Boys; Central Coast Patent Agency, Inc.

(57) ABSTRACT

A connection apparatus has a USB port coupled to a USB interface for connection to a computing device enabled to manage IP audio calls, a land-line telephone port coupled to a Four-Wire Analog telephone interface, for connection to a Four-Wire port of a land-line telephone, a wireless interface for coupling to a communication device enabled to manage voice calls over a network, an analog audio port for a headset, coupled to an analog audio interface, a plurality of protocol translation modules, and switching circuitry enabled to connecting individual ones of the ports through individual ones of the protocol translation modules.

7 Claims, 3 Drawing Sheets

VOICE PROTOCOL CONNECTOR APPARATUS

BACKGROUND OF THE INVENTION

1. Field of the Invention

The present invention is in the technical area of connecting voice telephony calls in different protocols through a computerized device.

2. Description of Related Art

There are several methods of voice telephony, including land line telephones, computerized softphone applications like Skype and Google Chat, and Bluetooth-capable cellular mobile devices, each of which transmits voice data in a different protocol. Currently, there is no simple way for a user to connect to calls in different protocols through one single device, using such as a standard analog audio headset. As such, users must field calls from various types of devices on each individual device. In addition, there is currently no way for a user to conduct a conference call with other users connected through these various types of devices transmitting in different protocols.

BRIEF SUMMARY OF THE INVENTION

In one embodiment of the invention a connection apparatus is provided, comprising a USB port coupled to a USB interface for connection to a computing device enabled to manage IP audio calls, a land-line telephone port coupled to a Four-Wire Analog telephone interface, for connection to a Four-Wire port of a land-line telephone, a wireless interface for coupling to a communication device enabled to manage voice calls over a network, an analog audio port for a headset, coupled to an analog audio interface, a plurality of protocol translation modules, and switching circuitry enabled to connecting individual ones of the ports through individual ones of the protocol translation modules.

In one embodiment the plurality of protocol translation modules comprise a module including software enabled to translate audio signals between four-wire analog audio protocol and analog audio protocol. Also in one embodiment the plurality of protocol translation modules comprise a module including software enabled to translate audio signals between Bluetooth™ audio and analog audio protocol. Also in one embodiment the plurality of protocol translation modules comprise a module including software enabled to translate audio signals between USB audio class protocol and analog audio protocol. Still in one embodiment the plurality of protocol translation modules comprise a module including software enabled to translate audio signals between four-wire analog audio protocol and Bluetooth™ audio protocol. And in one embodiment the plurality of protocol translation modules comprises a module including software enabled to translate audio signals between USB audio class protocol and Bluetooth™ audio protocol.

In one embodiment of the invention the internal circuitry comprises a module including software enabled to translate audio signals between Four-Wire analog audio protocol and USB Audio class protocol. Also in one embodiment of the invention there is a toggle input for muting voice from the headset, a volume control input, an answer/end call toggle input, a conference input, an input to connect the headset with the land-line telephone interface, an input to connect the headset with the Bluetooth™ interface, and an input to connect the headset with the USB interface.

In one embodiment the input to connect the headset with the land-line telephone interface operates a switching mechanism to connect through the module including software enabled to translate audio signals between Four-Wire analog audio protocol and analog audio protocol. Also in one embodiment the input to connect the headset with the Bluetooth wireless interface operates a switching mechanism to connect through the module including software enabled to translate audio signals between Bluetooth™ audio protocol and analog audio protocol. Also in one embodiment the input to connect the headset with the USB port operates a switching mechanism to connect through the module including software enabled to translate audio signals between USB audio class protocol and analog audio protocol. Still in one embodiment conference input operates a switching mechanism to connect all interfaces through appropriate translation modules, enabling audio communication between each interface and every other interface.

In another aspect of the invention an audio call connection method is provided, comprising steps for (a) connecting a computing device enabled to manage IP telephony calls to a USB interface of a connection device; (b) pairing a cellular communication device with wireless pairing circuitry of the connection device; (c) connecting a landline telephone to a landline telephone interface of the connection device; (d) connecting an analog headset to an analog audio interface of the connection device; and (e) connecting individual ones of the interfaces through appropriate protocol translation mechanisms, enabling voice communication between calls in the different protocols.

In one embodiment of the method in step (e) operation of an input marked as Landline on the connection device operates a switching mechanism that connects the analog audio interface with the landline telephone interface through a module including software enabled to translate audio signals between Four-Wire analog audio protocol and analog audio protocol. Also in one embodiment in step (e) operation of an input marked as Bluetooth™ on the connection device operates a switching mechanism that connects the analog audio interface with the Bluetooth™ wireless interface through a module including software enabled to translate audio signals between Bluetooth™ audio protocol and analog audio protocol. Still in one embodiment in step (e) operation of an input marked as USB on the connection device operates a switching mechanism that connects the analog audio interface with the USB interface through a module including software enabled to translate audio signals between USB audio class protocol and analog audio protocol. Also in one embodiment in step (e) operation of an input marked Konfer operates switching mechanisms connecting each interface to every other interface through appropriate modules including software enabled to translate audio signals between the protocols used at the different interfaces. In one embodiment the connection device comprises steps for muting, adjusting volume, and answering and ending calls through operation of dedicated inputs on the connector device.

DETAILED DESCRIPTION OF THE INVENTION

The inventor provides a system and method for fielding phone calls from various types of audio-capable devices through one central and computerized piece of hardware. The system and methods of the invention are described below according to the following embodiments.

Figure 1:
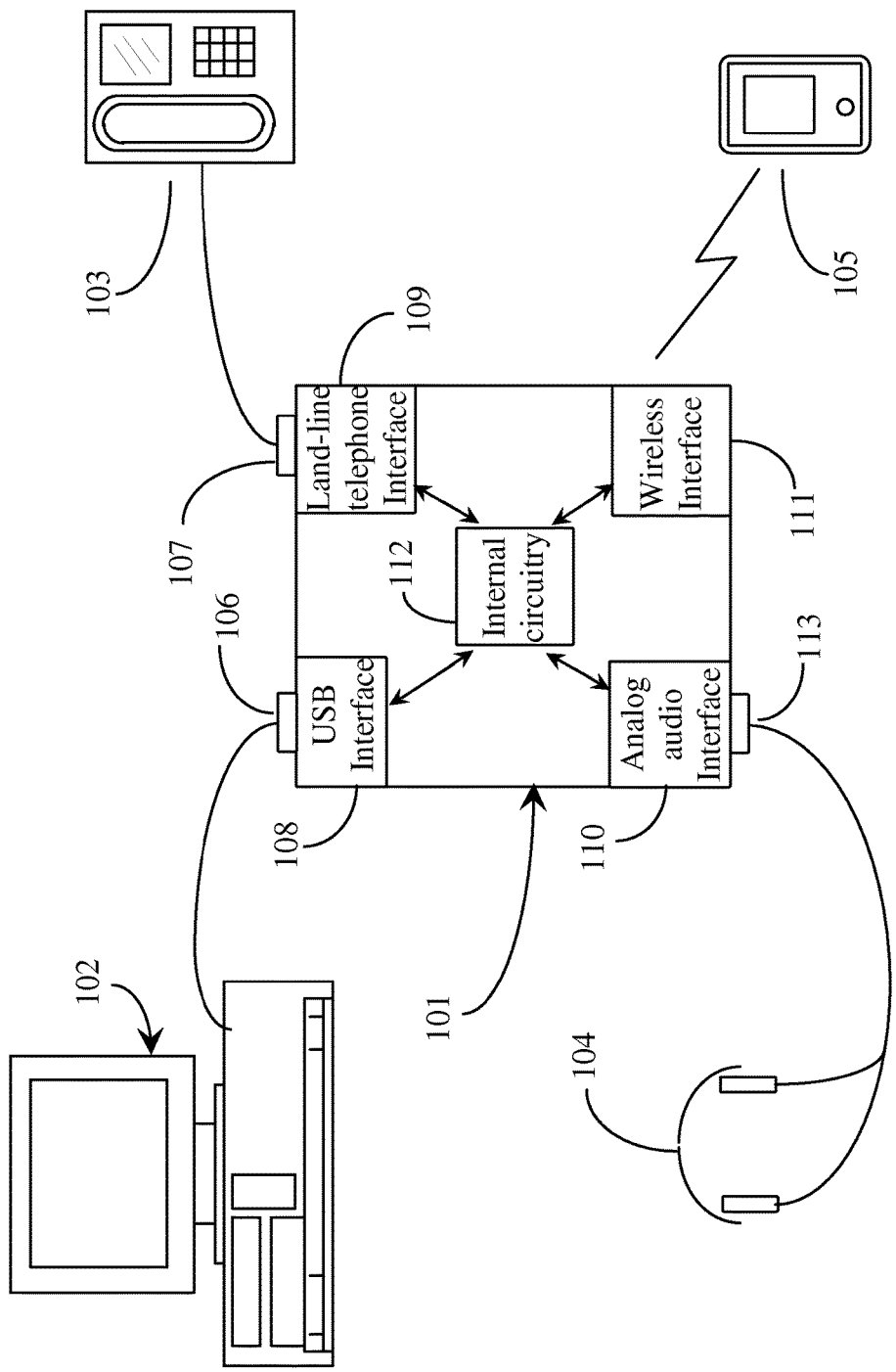
FIG. 1 illustrates a connecting device according to an embodiment of the invention.

Referring to FIG. 1, in one embodiment connection device 101 comprises a USB port 106 connected to USB circuitry 108, a land-line telephone port 107 connected to land-line telephony interface circuitry 109, an analog audio headset 104 connected to an analog audio interface 110, a wireless interface 111, and internal circuitry 112. In the example shown in FIG. 1 the headset 104 is plugged into port 113 connected to analog audio interface 110. In some embodiments the headset may have circuitry within the headset to translate between analog audio protocol and USB protocol, and will in that situation connect to port 113 coupled to a second USB interface instead of the analog audio port indicated.

As shown in FIG. 1 the connection device may interact with a standard PC computer 102 or any other communication device having USB input and output, a standard land line telephone 103, or any wireless-capable mobile communication device 105, which in this example is a cellular telephone, but might be an iPad or other electronic pad device, or any other device capable of near-field pairing.

The connect device is in various embodiments operable with any device or program capable of sending and receiving audio, and having the correct inputs, including a laptop computer, any standard PSTN land line telephone, or any Bluetooth-capable mobile phone or tablet running on any number of operating systems.

A standard PC or laptop computer 102 may connect to device 101 through USB port 106 connected to USB interface 108. PSTN land-line telephone 103 may connect to land-line telephone interface 109. In most circumstances interface 109 may be a four-wire analog interface. Any wireless-pairing—capable cellular device connects wirelessly using a near-field technology to wireless interface 111, which includes Bluetooth pairing circuitry in this embodiment. USB interface 108, land-line telephone interface 109, wireless interface 111, and analog audio interface 110 all connect to internal circuitry 112, which is configured in various embodiments to protocols from these different audio sources into an audio signal that the user can hear through headset 104 and to which the user may respond through the microphone of the headset, also in analog audio mode.

In one embodiment of this invention, a user may have laptop computer 102, a land-line telephone 103, and a cellular device with Bluetooth capability all connected to device 101. Normally the user would have to answer calls from these different devices individually, but when these devices are connected to connection device 101, the user can interact with calls from any of these devices through headset 104.

Figure 2:
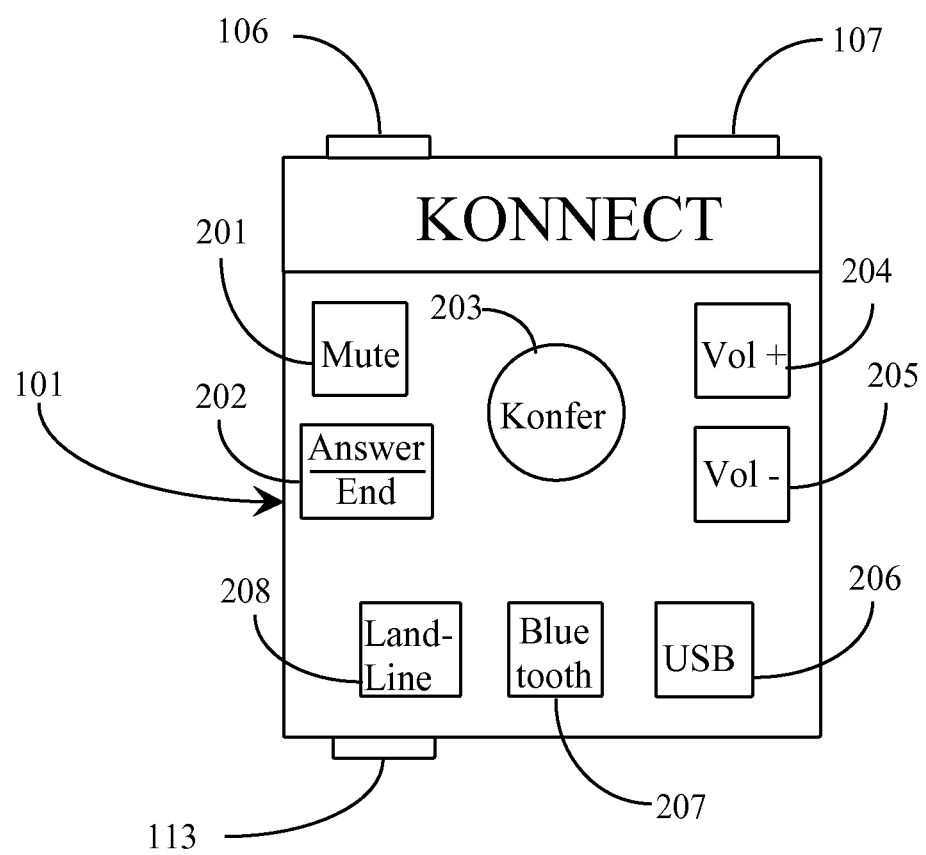
FIG. 2 illustrates the user interface and buttons of the connection device of FIG. 1.

Referring now to FIG. 2, the user interface of connection device 101 comprises USB ports 106, 113, and land-line port 107. The face of device 101 comprises buttons to enable connection between the user's headset and land-line telephone 104, Bluetooth device 105, and any softphone operating on a USB-capable device through USB port 106. There may also be a mute button 201, an Answer/End call button 202, which may be a toggle to use both to answer and to end a call, a volume increase button 204, a volume decrease button 205, and a Konfer button 203.

A user with the headphones 104 can field calls from different devices connected to various ports of Konnect device 101 as previously described by using one of three buttons 208 to connect to a land-line call, 207 to connect to a call from a Bluetooth™ device, or other wirelessly-connected devices in other embodiments, or 206 to connect to a call from a USB-enabled device, such as, for example a call from a softphone executing on PC 102, like a Skype call or a Google Chat call.

Konfer button 203 allows a user to conduct a conference call with multiple callers who may be using any number of different devices through a series of switching functions and translation software within connection device 101, implemented in internal circuitry 112.

Figure 3:
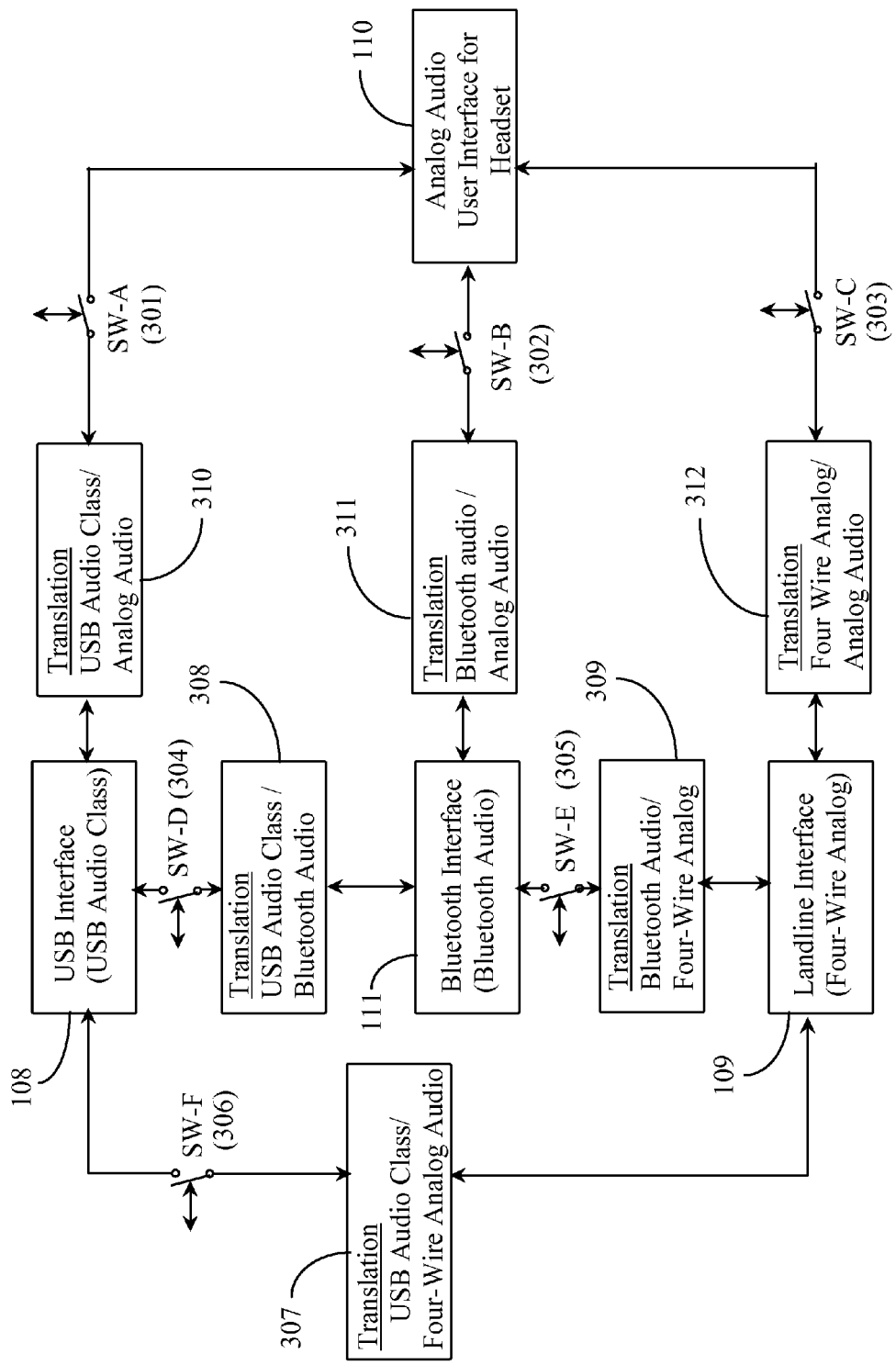
FIG. 3 illustrates the internal circuitry of the connection device.

Referring now to FIG. 3, elements 307, 308, 309, 310, 311, and 312 all represent translation software necessary to translate between audio streams in different protocols. Switches SW-A 301, SW-B 302, SW-C 303, SW-D 304, SW-E 305, and SW-F 306 all represent switching circuitry for connecting audio streams between different ports through the various software translation functions.

In one embodiment of this invention a user is connected to connection device 101 using headset 104 connected through analog audio interface 110. Should the user need to field a call from a computerized softphone program like Skype through USB interface 108, only switch SW-A 301 would need to be closed, allowing the connection device 101 to connect the softphone application with the user on headset 104 through translation software 310, translating between USB audio class protocol and analog audio protocol in both directions.

In another embodiment of this invention a user might need to field a call from a landline telephone through landline interface 109. In this instance, only switch SW-C 303 would be closed, allowing the connection device 101 to connect the landline telephone with the user on headset 104 using software translation instance 312. Software 312 will translate between four-wire analog audio at the landline interface 110 to analog audio at headphone interface 109.

In another embodiment of this invention, a user might need to field a call from a Bluetooth-capable cellular device interacting with Bluetooth interface 111. In this instance, only switch SW-B 302 would be closed, allowing the connection device 101 to connect the cellular telephone call with the user on headset 104 using software instance 311, translating between Bluetooth audio and Analog audio.

In another embodiment of this invention, a user might need to conduct a conference call with other callers using different audio protocols. In this instance, the user would make use of Konfer button 107 in order to allow the different audio protocols to interact with one another, as well as with headset device 104. Depending on what types of audio protocols are being used by the various users, the appropriate switches would close, allowing the necessary software routines to be engaged.

The embodiments described above are examples. Many alterations in these embodiments can be made within the spirit and scope of the invention. The invention is limited only by the claims that follow.

The invention claimed is:

1. A connection apparatus, comprising:
   a USB port coupled to a USB interface communicating with a computing device to manage IP audio calls, the USB interface directly connected to a first protocol translation module via switching circuitry, a second protocol translation module and a third protocol translation module;

a land-line telephone port coupled to a four-wire analog telephone interface communicating with a four-wire port of a land-line telephone, the four-wire analog telephone interface directly connected to the first protocol translation module, a fourth protocol translation module and a fifth protocol translation module;

a cellular wireless interface communicating with a communication device to manage voice calls over a cellular network, the cellular wireless interface directly connected to the second protocol translation module, the fourth protocol translation module and a sixth protocol translation module;

an analog audio port for a headset, coupled to an analog audio interface directly connected to the third protocol translation module, the fifth protocol translation module and the sixth protocol translation module;

switching circuitry enabled to connect between individual ones of the interfaces and individual ones of the protocol translation modules; and circuitry internal to the connection apparatus providing connection between the cellular wireless interface, the four-wire analog telephone interface and the USB interface through at least one of the protocol translation software modules via the switching circuitry;

wherein the first protocol translation module translates communication bi-directionally between the USB interface and the four-wire analog telephone interface, the second protocol translation module translates communication bi-directionally between the USB interface and the cellular wireless interface, the third protocol translation module translates communication bi-directionally between the USB interface and the analog audio interface, the fourth protocol translation module translates communication bi-directionally between the cellular wireless interface and the four-wire analog telephone interface, the fifth protocol translation module translates communication bi-directionally between the four-wire analog telephone interface and the analog audio interface and the sixth protocol translation module translates communication bi-directionally between the cellular wireless interface and the analog audio interface, and wherein any communication from any of the interfaces to the headset and any communication from the headset to any of the interfaces are translated by at least one of the protocol translation software modules, and the communication from any of the interfaces to the headset and the communication from the headset to any of the interfaces occur simultaneously.

2. The connection apparatus of claim 1 comprising a toggle input for muting voice from the headset, a volume control input, an answer/end call toggle input, a conference input, an input to connect the headset with the land-line telephone interface, an input to connect the headset with the cellular wireless interface, and an input to connect the headset with the USB interface.

3. The connection apparatus of claim 2 wherein the input to connect the headset with the USB port operates a switching mechanism to connect through the module including software enabled to translate audio signals between USB audio class protocol and analog audio protocol.

4. The connection apparatus of claim 2 wherein the conference input operates a switching mechanism to connect all interfaces through appropriate translation modules, enabling audio communication between each interface and every other interface.

5. An audio call connection method, comprising steps:
(a) connecting a computing device to manage IP telephony calls to a USB port coupled to a USB interface of a connection device, the USB interface directly connected to a first protocol translation module via a switching circuitry, a second protocol translation module and a third protocol translation module;
(b) pairing a cellular communication device with cellular wireless interface of the connection device, the cellular wireless interface directly connected to the second protocol translation module, a fourth protocol translation module and a sixth protocol translation module;
(c) connecting a landline telephone to a four-wire port coupled to a four-wire analog telephone interface of the connection device, the four-wire analog telephone interface directly connected to the first protocol translation module, the fourth protocol translation module and a fifth protocol translation module;
(d) connecting an analog headset to an analog audio port coupled to an analog audio interface of the connection device, the analog audio interface directly connected to the third protocol translation module, the fifth protocol translation module and the sixth protocol translation module;
(e) providing bi-directional communication translation between the USB interface and the four-wire analog telephone interface using the first the first protocol translation module, providing bi-directional communication translation between the USB interface and the cellular wireless interface using the second protocol translation module, providing bi-directional communication translation between the USB interface and the analog audio interface using the third protocol translation module, providing bi-directional communication translation between the cellular wireless and the four-wire analog telephone interface using the fourth protocol translation module, providing bi-directional communication translation between the four-wire analog telephone interface and the analog audio interface using the fifth protocol translation module and providing bi-directional communication translation between the cellular wireless interface and the analog audio interface using the sixth protocol translation module;
(f) enabling to connect between individual ones of said interfaces and individual ones of said protocol translation modules by a switching mechanism; and
(g) translating any communication from any of the interfaces to the headset and any communication from the headset to any of the interfaces are translated by at least one of the protocol translation software modules, and wherein the communication from any of the interfaces to the headset and the communication from the headset to any of the interfaces occurs simultaneously.

6. The method of claim 5 wherein in step (f) operation of an input marked Konfer operates switching mechanisms connecting each interface to every other interface through appropriate modules including software enabled to translate audio signals between the protocols used at the different interfaces.

7. The method of claim 5 wherein the connection device comprises steps for muting, adjusting volume, and answering and ending calls through operation of dedicated inputs on the connector device.

* * * * *